United States Patent
Baudisch et al.

(10) Patent No.: US 8,274,484 B2
(45) Date of Patent: Sep. 25, 2012

(54) TRACKING INPUT IN A SCREEN-REFLECTIVE INTERFACE ENVIRONMENT

(75) Inventors: Patrick M. Baudisch, Seattle, WA (US); Georg F. Petschnigg, Seattle, WA (US); David H. Wykes, Seattle, WA (US); Albert Yiu-So Shum, Bellevue, WA (US); Avi Geiger, Seattle, WA (US); Kenneth P. Hinckley, Redmond, WA (US); Michael J. Sinclair, Kirkland, WA (US); Joel B. Jacobs, Seattle, WA (US); Jonathan D. Friedman, Seattle, WA (US); Rosanna H. Ho, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 747 days.

(21) Appl. No.: 12/175,695

(22) Filed: Jul. 18, 2008

(65) Prior Publication Data

US 2010/0013777 A1    Jan. 21, 2010

(51) Int. Cl.
*G06F 3/033* (2006.01)
*G09G 5/00* (2006.01)
(52) U.S. Cl. .................... 345/173; 345/179; 715/863
(58) Field of Classification Search .................. 345/157, 345/159, 160, 162, 163, 167, 172, 173, 174, 345/179, 633; 715/863
See application file for complete search history.

(56) References Cited

U.S. PATENT DOCUMENTS

| | | | | |
|---|---|---|---|---|
| 5,446,906 A | * | 8/1995 | Kardach et al. | 713/323 |
| 6,061,004 A | * | 5/2000 | Rosenberg | 341/20 |
| 6,377,249 B1 | * | 4/2002 | Mumford | 345/179 |
| 6,509,889 B2 | * | 1/2003 | Kamper et al. | 345/157 |
| 6,611,259 B1 | * | 8/2003 | Tillgren et al. | 345/179 |
| 6,862,006 B2 | * | 3/2005 | Sato et al. | 345/8 |
| 7,082,444 B2 | * | 7/2006 | Braun et al. | 1/1 |

(Continued)

FOREIGN PATENT DOCUMENTS

EP    1 489 485 A2 * 12/2004

OTHER PUBLICATIONS

Greene, Kate, "Two-Sided Touch Screen", Retrieved at <<http://www.technologyreview.com/computing/19300/>>, Technology Review, Aug. 24, 2007, pp. 1-3.

(Continued)

*Primary Examiner* — Quan-Zhen Wang
*Assistant Examiner* — Michael J. Eurice
(74) *Attorney, Agent, or Firm* — Westman, Champlin & Kelly, P.A.

(57) ABSTRACT

In an example embodiment, a method is adapted to tracking input with a device. The method includes an act of monitoring and acts of activating and displaying if a touch input is detected. The device has a first side and a second side, with the second side opposite the first side. The device has a display screen disposed on the first side, and a screen-reflective interface disposed on the second side. Respective positions on the screen-reflective interface correspond to respective locations of the display screen. The screen-reflective interface of the device is monitored. If a touch input is detected on the screen-reflective interface, the device performs acts of activating and displaying. Specifically, a tracking state is activated for the screen-reflective interface responsive to the detected touch input on the screen-reflective interface. The interface icon is displayed on the display screen to indicate that the tracking state has been activated.

17 Claims, 12 Drawing Sheets

U.S. PATENT DOCUMENTS

| | | | |
|---|---|---|---|
| 7,382,361 B2 * | 6/2008 | Burstrom et al. | 345/179 |
| 7,456,823 B2 * | 11/2008 | Poupyrev et al. | 345/173 |
| 7,634,675 B2 * | 12/2009 | Liebenow | 713/324 |
| 7,653,883 B2 * | 1/2010 | Hotelling et al. | 715/863 |
| 7,710,397 B2 * | 5/2010 | Krah et al. | 345/163 |
| 2005/0052425 A1 * | 3/2005 | Zadesky et al. | 345/173 |
| 2005/0104867 A1 * | 5/2005 | Westerman et al. | 345/173 |
| 2005/0270276 A1 * | 12/2005 | Sugimoto et al. | 345/173 |
| 2007/0291008 A1 | 12/2007 | Wigdor et al. | |

OTHER PUBLICATIONS

Baudisch, et al., "Back-of-Device Interaction Allows Creating Very Small Touch Devices", Retrieved at <<http://www.patrickbaudisch.com/publications/2009-Baudisch-CHI09-BackOfDeviceInteractionAllowsCreatingVerySmallTouchDevices.pdf>>, Proceedings of the 27th international conference on Human factors in computing systems, Apr. 4-9, 2009, 10 Pages.

"Firm Develops Two-Sided Touchscreen", Retrieved at <<http://www.electronista.com/articles/08/08/29/two.sided.touchscreen/>>, Aug. 29, 2008, pp. 1-3.

Wobbrock, et al., "The Performance of Hand Postures in Front-and Back-of-Device Interaction for Mobile Computing", Retrieved at <<http://faculty.washington.edu/wobbrock/pubs/ijhcs-08.pdf>>, International Journal of Human-Computer Studies, vol. 66, No. 12, Dec. 2008, pp. 857-875.

Wigdor, et al., "LucidTouch: A See-through 2-Sided Touch Mobile Device", Retrieved at <<http://www.merl.com/projects/lucid-touch/>>, Mitsubishi Electric Research Laboratories, Aug. 4, 2009, pp. 1-2.

Wigdor, et al., "Under the Table Interaction", Retrieved at <<http://www.cliftonforlines.com/papers/2006_wigdor_under_the_table.pdf>>, The nineteenth annual ACM Symposium on User Interface Software and Technology, Oct. 15-18, 2006, 10 Pages.

Shen, et al., "Double-Side Multi-Touch Input for Mobile Devices", Retrieved at <<http://mll.csie.ntu.edu.tw/papers/chi2009_wip_double-side.pdf>>, Proceedings of the 27th international conference extended abstracts on Human factors in computing systems, Apr. 4-9, 2009, 6 Pages.

Lane, Slash, "Apple Filing Reveals Multi-Sided iPod with Touch Screen Interface", Retrieved at <<http://www.appleinsider.com/articles/07/05/10/apple_filing_reveals_multi_sided_ipod_with_touch_screen_interface.html>>, May 10, 2007, pp. 1-4.

Wigdor, et al., "Lucid touch: a see-through mobile device", Retrieved at <<http://www.cliftonforlines.com/papers/2007_wigdor_lucidtouch.pdf>>, Proceedings of the 20th Annual ACM Symposium on User interface Software and Technology, Oct. 7-10, 2007, 10 Pages.

* cited by examiner

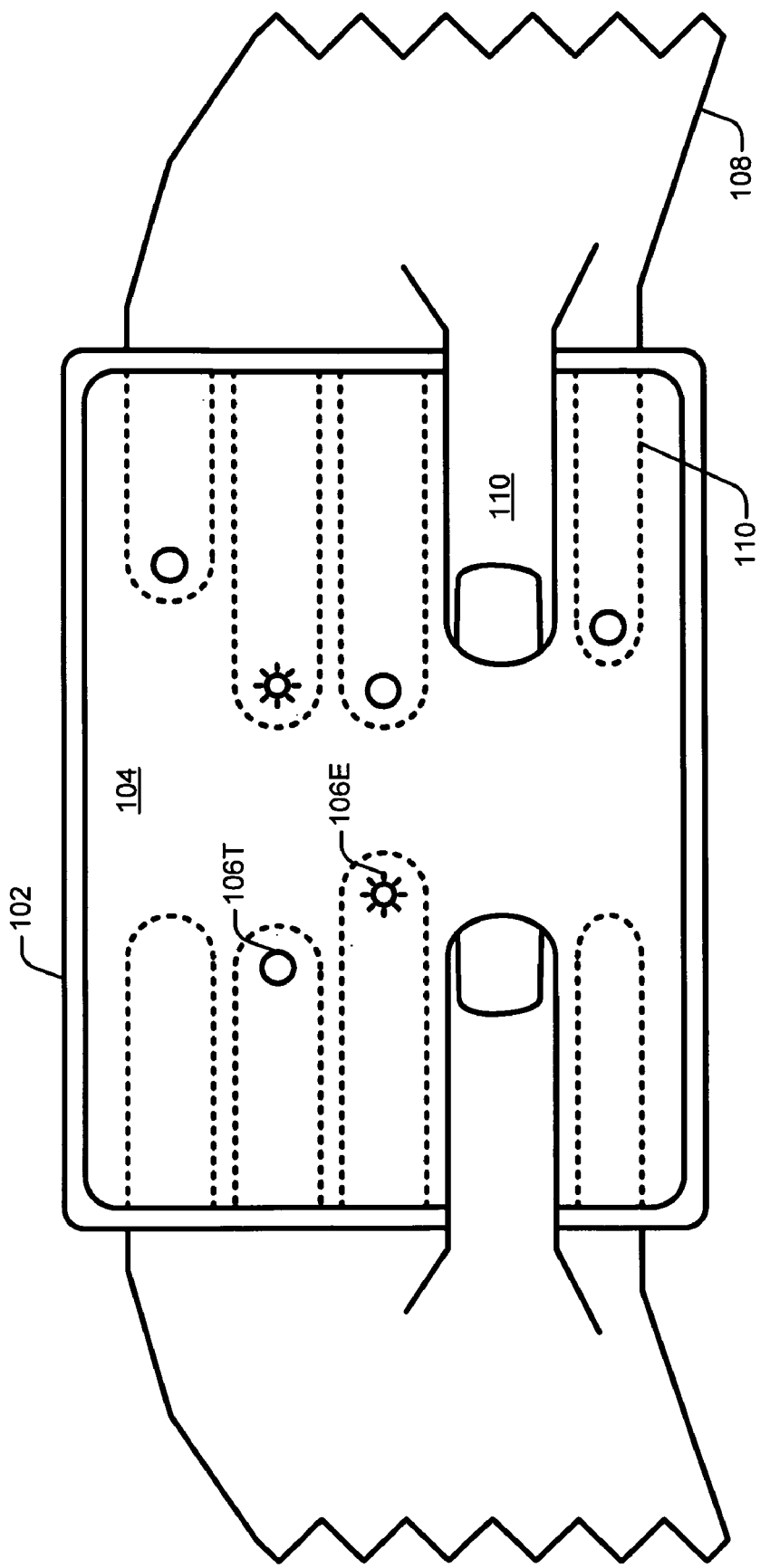

US 8,274,484 B2

TRACKING INPUT IN A SCREEN-REFLECTIVE INTERFACE ENVIRONMENT

BACKGROUND

Many electronic devices today are portable. Notebook computers, ultra-portable computers, mobile phones, entertainment appliances, and navigational tools are just a few examples of portable devices. Portable devices, especially as they become smaller, are less likely to include a full-size keyboard, a tethered remote, an attached mouse, and so forth. Nevertheless, some input interface is typically needed to enable a user to control the device.

Thus, most portable devices include some kind of integrated input interface. Example integrated input interfaces include miniaturized keyboards, single buttons, touch screens, track pads, dials, directional buttons, and so forth. Each of these existing integrated input interfaces has drawbacks. For example, miniaturized keyboards, single buttons, and dials are not adept at enabling a user to control a pointer indicator of a graphical user interface (GUI). Track pads and directional buttons do enable interaction with a GUI pointer indicator, but the former can be imprecise and the latter is usually slow and inconvenient to use.

Moreover, each of these integrated input interfaces typically demands additional surface area on and/or significant volume of the device, both of which result in a larger portable device. With a touch screen, on the other hand, the face of the device does not need to be increased to accommodate an integrated input interface. Unfortunately, when an individual is attempting to interact with a touch screen, the user's finger or fingers block the details of the desired screen target. The remaining portion of the user's hand can also obscure other display portions of the touch screen. It is therefore apparent that many deficiencies still exist for conventional integrated input interfaces for portable devices.

SUMMARY

For certain example embodiments generally in a screen-reflective interface environment, a GUI may be manipulated by a user with a touch-sensitive integrated input interface that is disposed oppositely to a display screen of a device. Three states may be enabled: an out-of-range state, a tracking state, and an engaged state. When no contact is detected, the interface is in the out-of-range state. When a touch input is detected, the tracking state is activated, and an interface icon is displayed on the display screen. When a press input is detected, the engaged state is activated, and distinct interface functionality is initiated.

In an example embodiment, a device has a first side and a second side, with the second side being opposite the first side. The device has a display screen disposed on the first side and a screen-reflective interface disposed on the second side. Respective positions on the screen-reflective interface correspond to respective locations of the display screen. In operation, the screen-reflective interface of the device is monitored.

During operation, if a touch input is detected on the screen-reflective interface, acts of activating and displaying are performed. A tracking state for the screen-reflective interface is activated responsive to the detected touch input on the screen-reflective interface. An interface icon is displayed on the display screen to indicate that the tracking state has been activated, with the interface icon being displayed at a location of the display screen that corresponds to a position of the touch input on the screen-reflective interface.

If a press input is detected at the screen-reflective interface while the tracking state is active, acts of activating and initiating are performed. An engaged state for the screen-reflective interface is activated responsive to the detected press input at the screen-reflective interface. Also, a distinct interaction functionality for the engaged state is initiated. Alternatively, a press input may be detected at a button input of the device during the tracking state to precipitate activation of the engaged state.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Moreover, other systems, methods, devices, media, apparatuses, arrangements, and other example embodiments are described herein.

BRIEF DESCRIPTION OF THE DRAWINGS

The same numbers are used throughout the drawings to reference like and/or corresponding aspects, features, and components.

FIGS. 3A and 3B illustrate example front views of a device having a form factor that is suitable for two-handed interaction, with the front views showing a display screen.

DETAILED DESCRIPTION

Figure 1A:
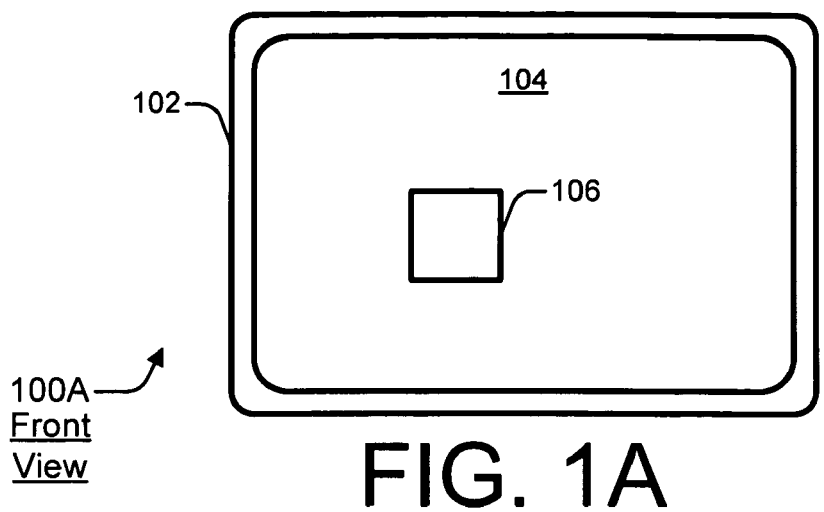
FIGS. 1A, 1B, and 1C illustrate an example front view, back view, and side view, respectively, of a device having a display screen and a screen-reflective interface.

As explained herein above, conventional integrated input interfaces for portable devices have existing deficiencies that have yet to be remedied. With respect to touch screens, they do not require that a portion of the front of the device be devoted to the integrated input interface. Unfortunately, fingers of the user can block a desired screen target that is to be selected, and the hand of the user can also obscure other portions of the touch screen.

The tendency of the fingers and hand to block and obscure a display screen when a conventional touch screen is being used may be remedied by incorporating a touch-sensitive panel on the other side of the device opposite the display screen. In other words, a display screen may be disposed on a first side of a device, and a touch-sensitive panel may be disposed on the second side. With this arrangement, the first side of the device is opposite the second side.

One approach to implementing a touch-sensitive panel on a side opposite the display screen is to introduce a hover state. With a hover state, a user moves fingers over the touch-sensitive panel without touching the panel. An optical apparatus determines the position of the user's fingers on the touch-sensitive panel. When the touch-sensitive panel is touched, the touch-sensitive panel detects the touch. The position of the touch is ascertained based on the position of the fingers as determined by the optical apparatus.

This optical-based approach is workable, but it does have drawbacks. First, the optical apparatus is likely to be large and relatively unwieldy, at least for a truly portable device. Second, the positional determination is likely to be imprecise. Third, users tend to find it difficult to "hover" their fingers above the touch-sensitive panel without actually touching it. Hovering can be difficult when the touch-sensitive panel is visible. It is all the more difficult when the touch-sensitive panel is out-of-view on the "backside" of the device opposite the display screen.

In contrast, for an example embodiment that is described herein, a user may touch a touch-sensitive panel on the "backside" of a device to activate a tracking state. At least one position that is currently being touched may be tracked. This current touch position is reflected by a current location of an interface icon that is displayed on a display screen. When a press input is detected, distinct interface functionality may be initiated.

In an example embodiment, a device that is capable of tracking input includes a first side, a second side, a display screen, and a screen-reflective interface. The second side is opposite the first side. The display screen is disposed on the first side, and the screen-reflective interface is disposed on the second side. Respective positions on the screen-reflective interface correspond to respective locations of the display screen. The device further includes a detection unit to monitor the screen-reflective interface. The detection unit includes a touch detector to detect a touch input on the screen-reflective interface. If the touch detector detects a touch input, the touch detector is to activate a tracking state for the screen-reflective interface responsive to the detected touch input on the screen-reflective interface. If the touch detector detects a touch input at a particular position, the touch detector is also to indicate that the tracking state has been activated by causing an interface icon to be displayed on the display screen at a particular location that corresponds to the particular position.

By way of example, an interface environment for a device having a screen-reflective interface may include three states: an out-of-range state, a tracking state, and an engaged state. When no contact is detected at the screen-reflective interface, the out-of-range state is active. During the out-of-range state, no interface icon is displayed, at least responsive to or with respect to input received via the screen-reflective interface. When a touch input is detected at the screen-reflective interface, the tracking state is activated and an interface icon is displayed on the display screen. While the tracking state is active, the interface icon is moved to locations on the display screen that correspond to positions being touched on the screen-reflective interface.

While the tracking state is active, if a press input is detected (e.g., at the screen-reflective interface or a button of the device), the engaged state is activated. When the engaged state is activated, distinct interface functionality may be initiated. Examples of distinct interface functionality include, but are not limited to, mouse-type clicks, drag-and-drop operations, combinations thereof, and so forth. Additional example embodiments and implementations are described further herein below.

Figure 1B:
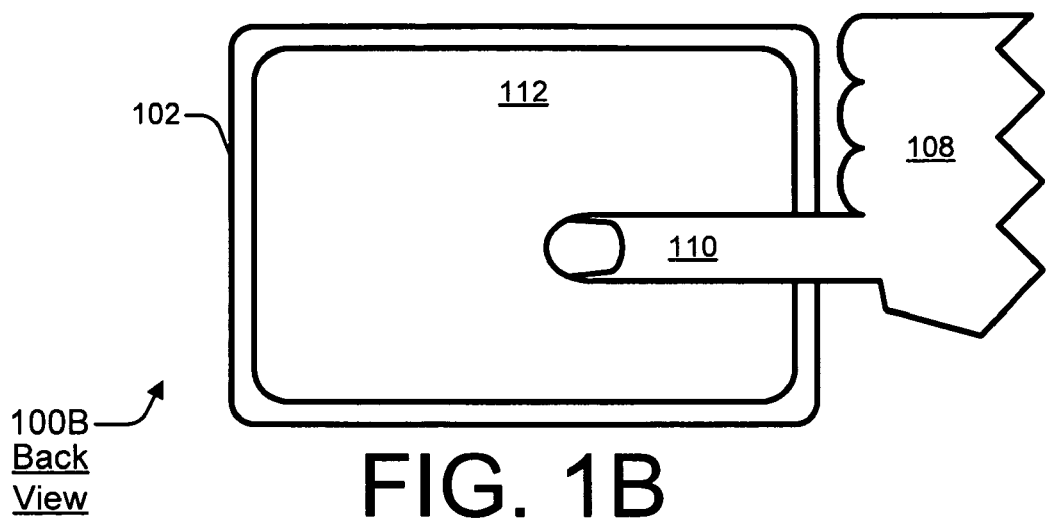
Figure 1C:
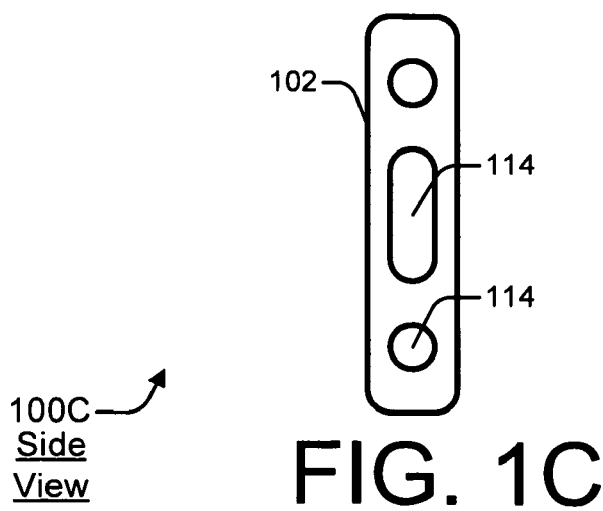

FIGS. 1A, 1B, and 1C illustrate an example front view 100A, back view 100B, and side view 100C, respectively, of a device 102 having a display screen 104 and a screen-reflective interface 112. As illustrated, device 102 includes a first side as shown in front view 100A and a second side as shown in back view 100B. The first side is opposite the second side. Display screen 104 is disposed on the first side of device 102. Screen-reflective interface 112 is disposed on a second side of device 102. A finger 110 of a hand 108 is shown proximate to screen-reflective interface 112. It should be noted that to facilitate a clear description, the device side having display screen 104 is arbitrarily referred to herein as the front side of device 102.

In an example embodiment, physical contact to screen-reflective interface 112 may be used to produce interactions with display screen 104. Physical contact may be, for example, a touch, a press, a movement combined with a touch or press, etc. by finger 110. From time to time, one or more interface icons 106 are displayed on display screen 104. For instance, interface icon 106 may be displayed when finger 110 is in contact with screen-reflective interface 112. Different interaction states that depend on the presence and/or type of contact by finger 110 with screen-reflective interface 112 are described herein below with particular reference to FIGS. 2A-2D.

Positions on screen-reflective interface 112 are proportional to locations on display screen 104. Thus, movements on display screen 104 (e.g., by an interface icon 106) may be made proportional to movements on screen-reflective interface 112 (e.g., by a touching finger 110). A position on screen-reflective interface 112 has a corresponding location on display screen 104. A position in the middle of screen-reflective interface 112 corresponds to a location in the middle of display screen 104.

However, the positions of screen-reflective interface 112 mirror or reflect the corresponding locations of display screen 104. A position in the top-left of screen-reflective interface 112 corresponds to a location in the top-right of display screen 104. Similarly, a position in the middle-right of screen-reflective interface 112 corresponds to a location in the middle-left of display screen 104. Consequently, touching a given position on screen-reflective interface 112 can cause an interface icon 106 to be displayed in the corresponding location of display screen 104.

A one-to-one correspondence between detectable touch positions and displayable pixels locations may be created, but such a one-to-one correspondence is not necessary to establish proportionality. Different touch position granularities and pixel location resolutions may be implemented. For example, each detectable touch position may correspond to a block (e.g., a 4×4 block) of displayable pixel locations. On the other hand, the granularity of touch positions may be greater than the resolution of pixel locations.

Screen-reflective interface 112 may be any size (e.g., height and width) relative to display screen 104, but the proportionality of correspondences between positions on screen-reflective interface 112 and locations of display screen 104 is maintained. In an example embodiment, however, a size of screen-reflective interface 112 is substantially equal to a size of display screen 104 to facilitate an intuitive feel for the touch-position and display-location correspondence. This intuitive feel may be maintained even if the relative sizes differ to some degree (e.g., by approximately 20%) such that a size of screen-reflective interface 112 is smaller or larger than a size of display screen 104. To increase ease-of-use and precision at the edges of display screen 104, screen-reflective interface 112 may be about one-half the width of a finger larger than display screen 104 at each of the four edges (e.g., left, right, top, and bottom).

For side view 100C of FIG. 1C, device 102 is shown as having one or more buttons 114. In certain embodiments, pressing a button 114 in conjunction with contact to screen-reflective interface 112 may also enable interaction with device 102. A button 114 may be a standard binary button with pressed and released positions, a directional button (including ones that may be used like a standard binary button when pressed in their center), a dial that may be used like a standard binary button when pressed, and so forth. Although three buttons 114 are shown, device 102 may have more or fewer (including no) buttons. Also, one or more buttons 114 may be located on different sides of device 102.

Device 102 may be, by way of example but not limitation, a notebook computer, an ultra-portable computer, a mobile phone or other communication-oriented device, an entertainment appliance (e.g., a game player, a music player, a video player, etc.), a navigational tool (e.g., a GPS-capable device), some combination thereof, and so forth. Also, device 102 need not be portable as long as the "back" side of the device opposite display screen 104 is accessible to a human operator. Display screen 104 may be a liquid crystal display (LCD), an organic light emitting diode (OLED) display, a digital ink display, and so forth. It should be noted that display screen 104 may also be touch sensitive to increase the number of interaction options. An example implementation for a device 102 is described further herein below with particular reference to FIG. 6.

FIGS. 2A, 2B, 2C, and 2D illustrate an example out-of-range state 200A, tracking state 200B, tracking state with movement 200C, and engaged state 200D, respectively, for a screen-reflective interface 112. Each respective state 200 indicates a respective contact type 202 that finger 110 has with regard to screen-reflective interface 112. The associated appearance of display screen 104 is also illustrated. Example embodiments for each of the different states 200A-200D are described below.

For out-of-range state 200A, finger 110 has no contact 202A with screen-reflective interface 112. This is the inactive out-of-range condition at 204. The appearance of display screen 104 includes the illustrated background (e.g., rolling hills). For no contact 202A between finger 110 and screen-reflective interface 112, no interface icon is displayed at 206.

For tracking state 200B, finger 110 has a touch type of contact 202B with screen-reflective interface 112. This touch contact 202B activates the tracking state at 208. When the tracking state is activated, an interface icon is displayed. The appearance of display screen 104 is therefore updated by displaying at 210 an interface icon 106. The location at which interface icon 106 is displayed on display screen 104 corresponds to a position at which finger 110 touches screen-reflective interface 112.

For tracking state with movement 200C, finger 110 has a touch plus finger movement type of contact 202C with screen-reflective interface 112. While the tracking state is active as at 212, movement of finger 110 with continued touch input on screen-reflective interface 112 causes a proportional amount of movement to interface icon 106 on display screen 104. The appearance of display screen 104 is therefore updated by moving at 214 the location of interface icon 106. More specifically, the location on display screen 104 to which interface icon 106 is moved corresponds to the position on screen-reflective interface 112 to which finger 110 is moved. The speed or frequency of the location updates of interface icon 106 as the position of finger 110 changes may vary.

Figure 2A:
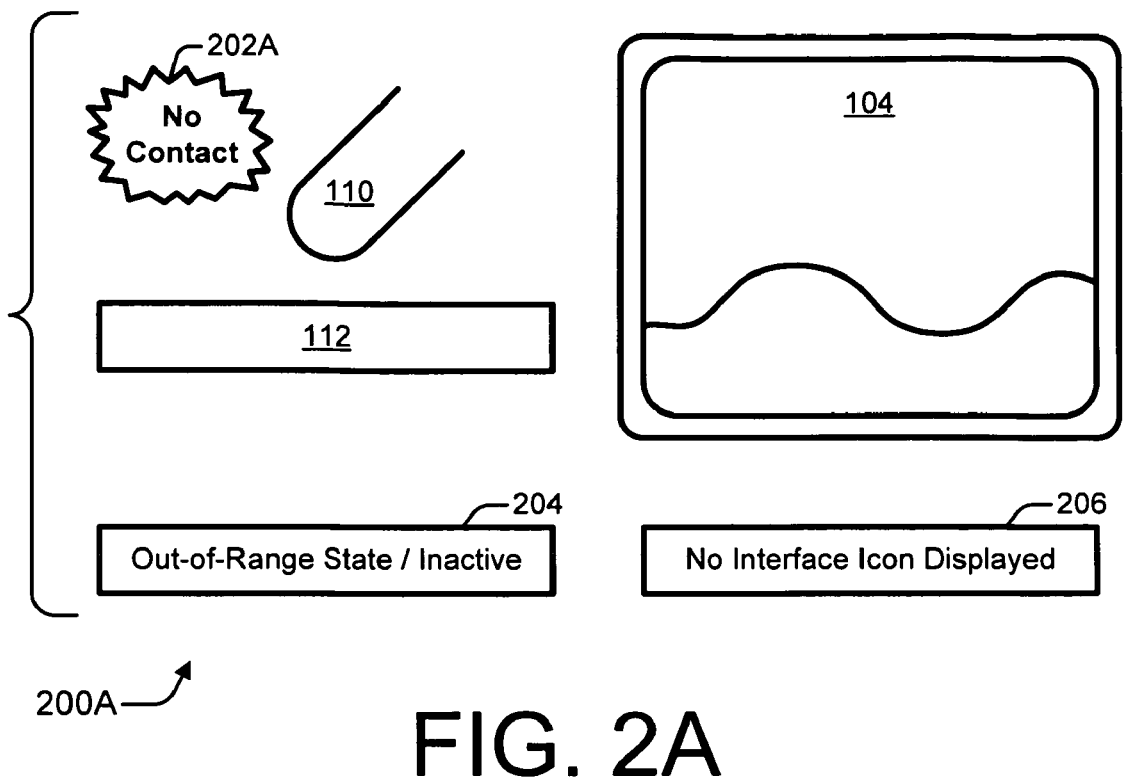
FIGS. 2A, 2B, 2C, and 2D illustrate an example out-of-range state, tracking state, tracking state with movement, and engaged state, respectively, for a screen-reflective interface.
Figure 2B:
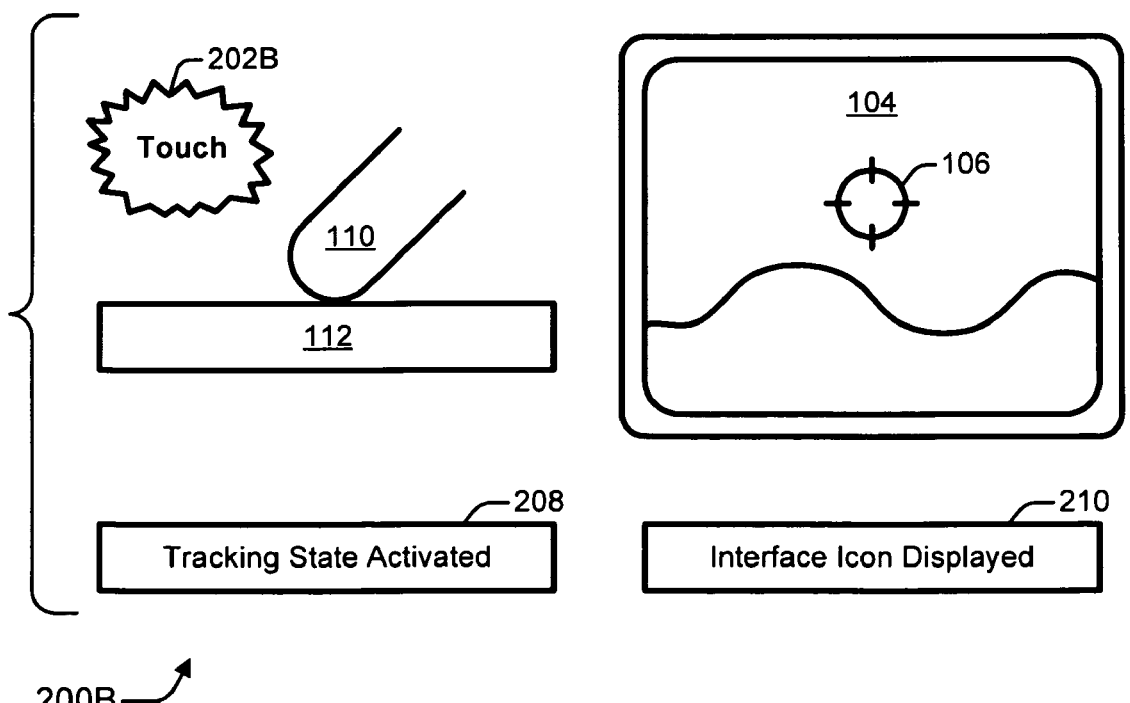
Figure 2C:
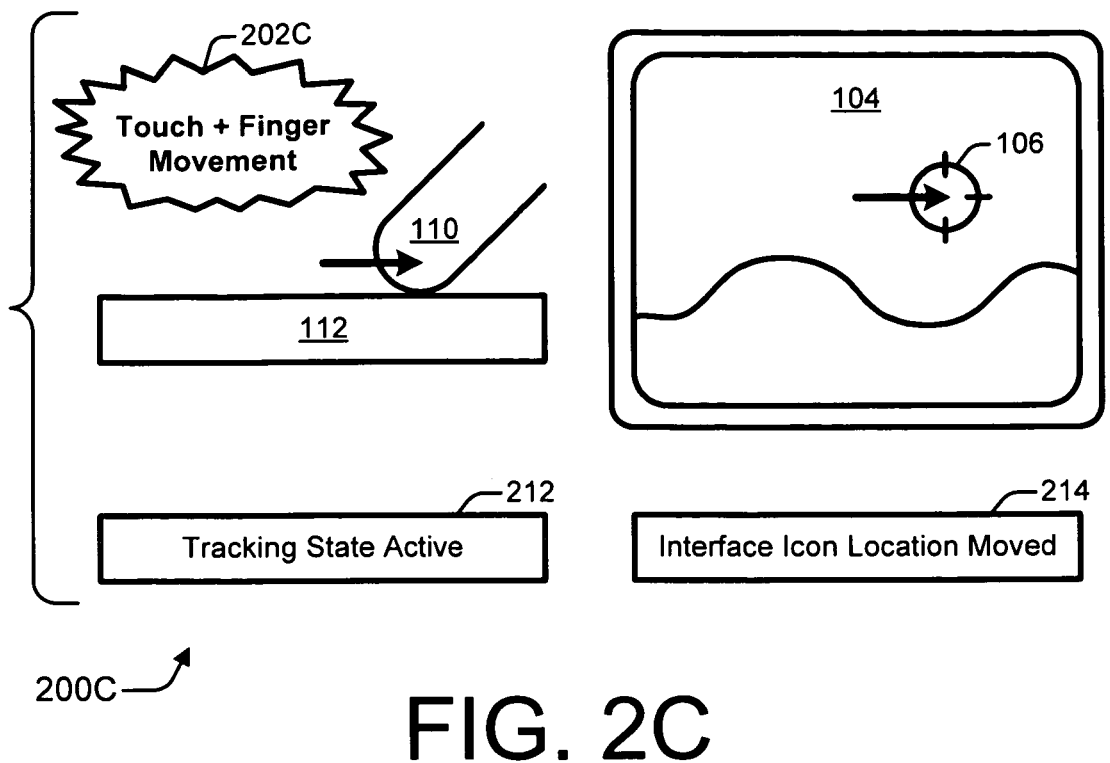
Figure 2D:
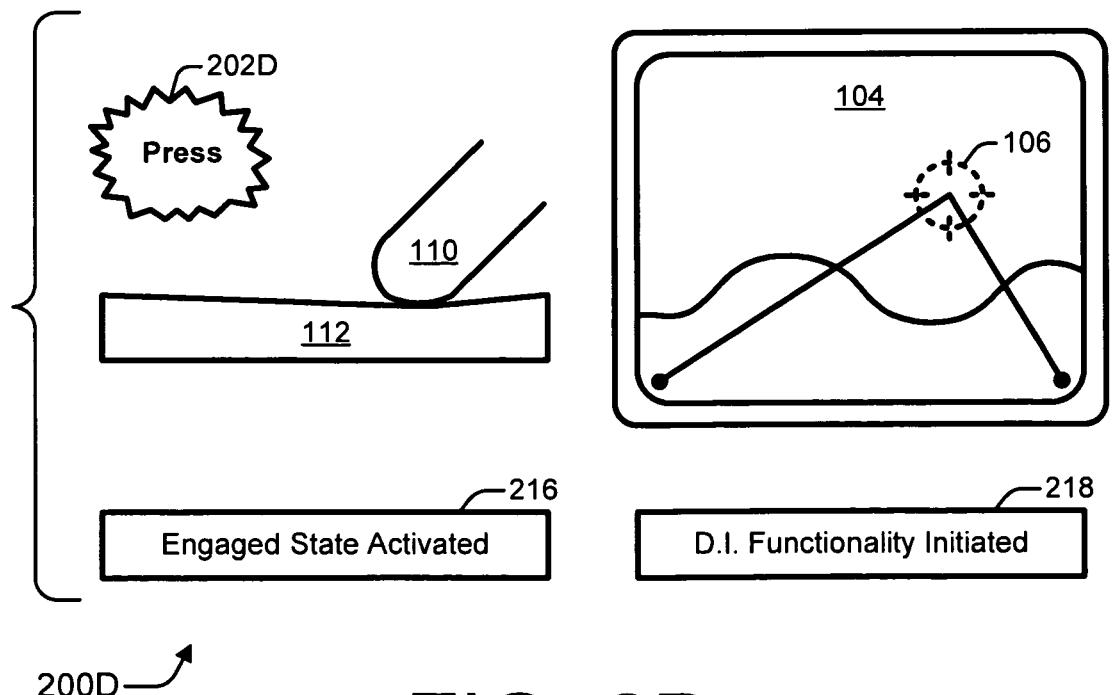

For engaged state 200D, finger 110 has a press type of contact 202D with screen-reflective interface 112. This press contact 202D activates the engaged state at 216. When the engaged state is activated, distinct interface functionality is initiated at 218. As shown by the updated display screen 104, a weapon is fired at the current location of interface icon 106 in the example of FIG. 2D. The appearance of interface icon 106 may also be changed when the engaged state is activated, as shown. Although screen-reflective interface 112 is shown in FIG. 2D as being locally-depressed by the press contact 202D of finger 110, presses may affect screen-reflective interface 112 differently. For example, the entirety of screen-reflective interface 112 may be depressed uniformly. Also, screen-reflective interface 112 may not be physically depressed when an electrical scheme is used to detect press contact 202D. Furthermore, press contact 202D may correspond to a press of a button of the device instead of a press of screen-reflective interface 112.

Generally, distinct interface functionality is initiated based on the current location of interface icon 106 and/or the current position of the touch input from finger 110. In other words, but by way of example only, a press contact 202D while the tracking state is active may be equivalent to a mouse click that activates an engaged state. Although not shown in FIG. 2D, if finger 110 is moved during the engaged state (e.g., finger 110 is moved while pressing screen-reflective interface 112 or while a button is being pressed), a dragging operation may be performed based on a location of interface icon 106 when the press contact 202D commences. Ceasing the press contact 202D may be equivalent to a drop operation. Also, although the engaged state is activated at 216 by a press contact 202D of screen-reflective interface 112 in FIG. 2D, it may alternatively be activated by a press contact 202D of a button 114 (e.g., of FIG. 1C).

Figure 3B:
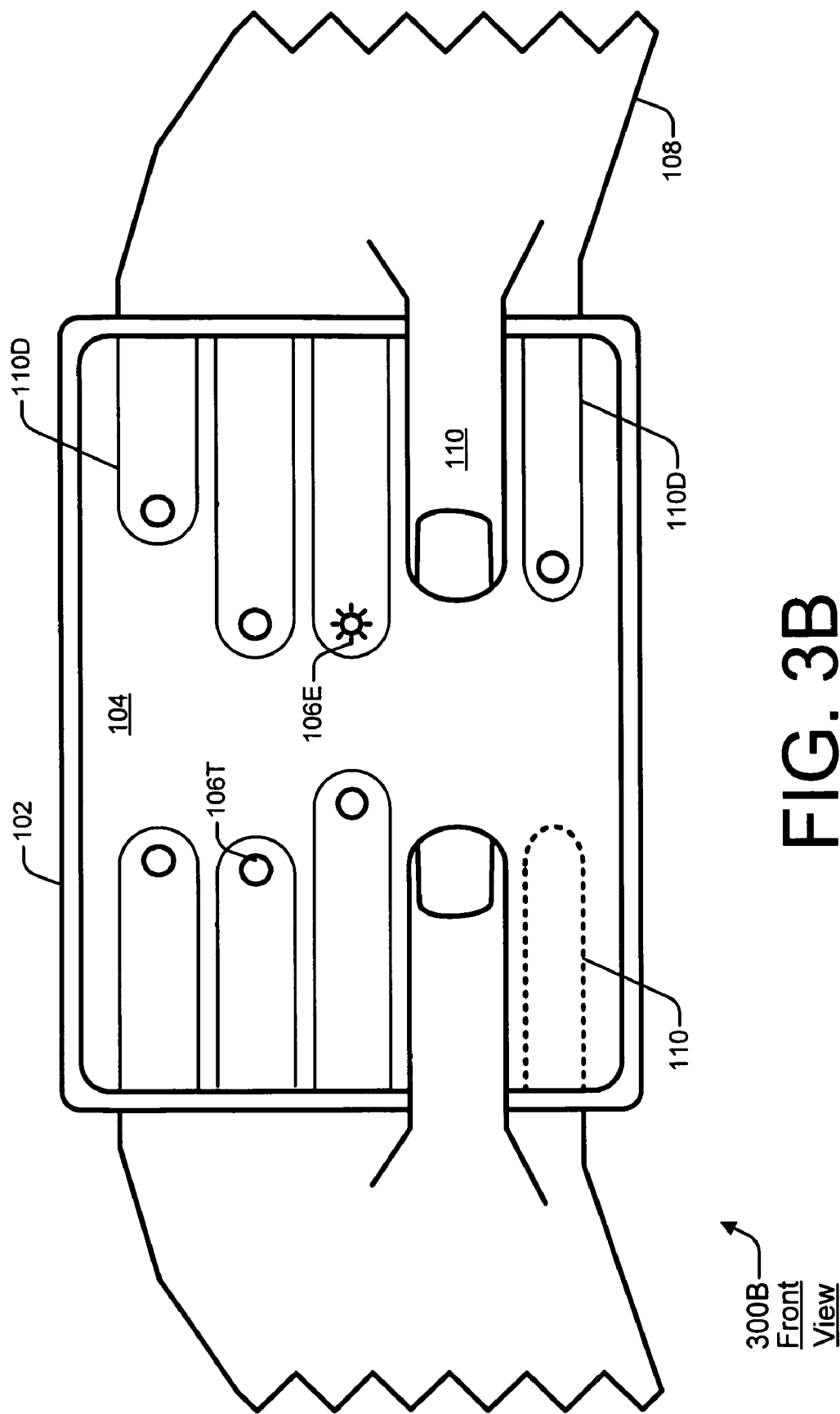

FIGS. 3A and 3B illustrate example front views 300A and 300B of a device 102 having a form factor that is suitable for two-handed interaction, with the front views showing a display screen 104. As illustrated, front view 300A and front view 300B both include two hands 108 holding device 102 with fingers 110. Display screen 104 is facing a user having hands 108. If display screen 104 is touch sensitive, the thumb fingers 110 may also be used to interact with device 102.

In front view 300A, the fingers 110 that are hidden from sight are shown with dashed lines. In front view 300B, images of the fingers 110D are displayed on display screen 104. The images of fingers 110D may be displayed in any of a number of different ways. For example, they may be displayed in outline form. They may also be displayed completely but translucently such that the image contents of display screen 104 remain discernable to the user. The images of fingers 110D may also be displayed translucently so as to look like actual fingers. The user may be given the opportunity to indicate skin color or otherwise select a desired appearance for fingers 110D. The resulting effect of displaying translucent finger images is that display screen 104 practically appears to be at least partially transparent with the displayed images of fingers 110D showing "thru" the "transparent" display screen.

Figure 3C:
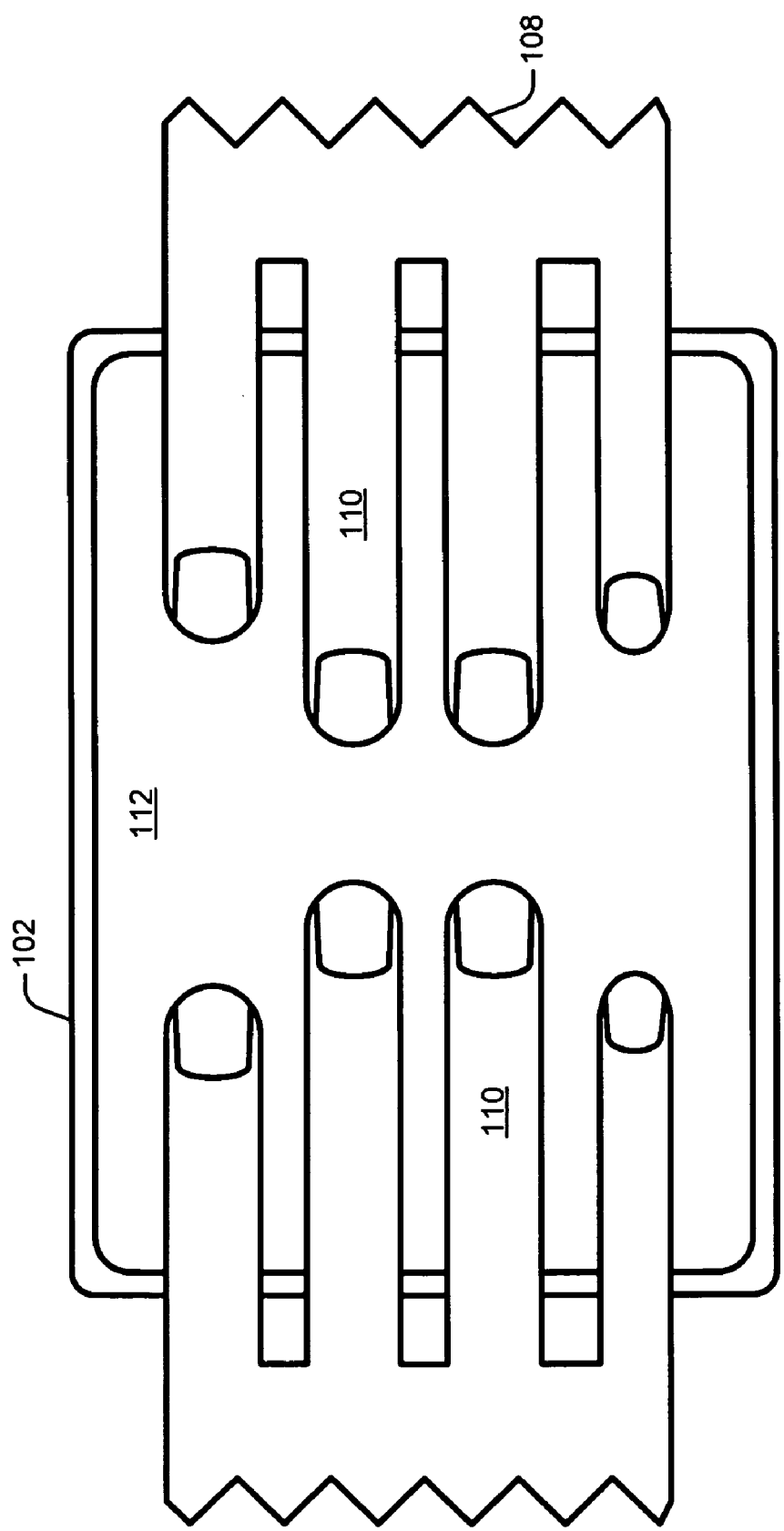
FIG. 3C illustrates an example back view of the device having a form factor that is suitable for two-handed interaction, with the back view showing a screen-reflective interface.

FIG. 3C illustrates an example back view 300C of device 102 having a form factor that is suitable for two-handed interaction, with the back view showing a screen-reflective interface 112. Fingers 110 of hands 108 are shown touching, pressing, or merely in proximity to screen-reflective interface 112. In an example embodiment, screen-reflective interface 112 includes a touch-sensitive component and may include a pressure-sensitive component. Examples of such components are described herein below with particular reference to FIG. 4.

In an example embodiment, with reference to FIGS. 3A and 3B, display screen 104 includes one or more interface icons 106. The appearance of interface icons 106 may change depending on which state is currently active. Specifically, an interface icon 106T is displayed when a tracking state is active. An interface icon 106E is displayed when an engaged state is active. Although interface icons 106 are shown changing appearance upon a transition from the tracking state to the engaged state, the appearance of an interface icon 106 may alternatively be the same for each state.

For front view 300A of FIG. 3A, six fingers are in contact with screen-reflective interface 112 (not shown in FIG. 3A). Four fingers are currently touching screen-reflective interface 112 on the back side of device 102 as indicated by the four circular interface icons 106T. Two fingers are currently pressing screen-reflective interface 112 on the back side of device 102 as indicated by the two star-shaped interface icons 106E. Because screen-reflective interface 112 is capable of discerning whether individual finger(s) 110 are performing a press type of contact, in the example embodiments of FIGS. 3A and 3B screen-reflective interface 112 is capable of sensing both multi-touch and multi-pressure inputs.

For front view 300B of FIG. 3B, seven fingers are currently in contact with screen-reflective interface 112. The one finger 110 in back of device 102 that is not in contact with screen-reflective interface 112 is hidden and represented by dashed lines. The seven fingers in back of device 102 that are in contact with screen-reflective interface 112 are represented by the displayed fingers 110D. As noted above, these displayed fingers 110D may be produced on display screen 104 in outline, translucent, or another form. Five fingers are currently touching screen-reflective interface 112 as indicated by the five interface icons 106T. One finger is currently pressing screen-reflective interface 112 as indicated by the single interface icon 106E.

Figure 3D:
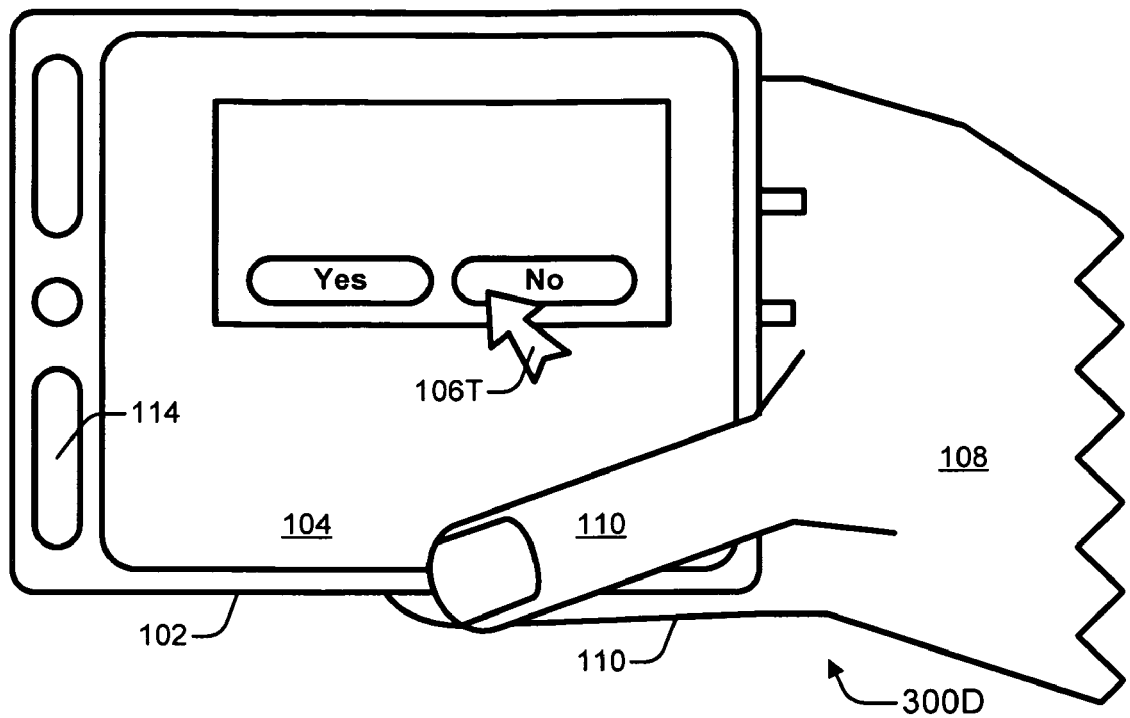
FIGS. 3D and 3E illustrate example front views of a device having a form factor that is suitable for one-handed interaction, with the front views showing a display screen.
Figure 3E:
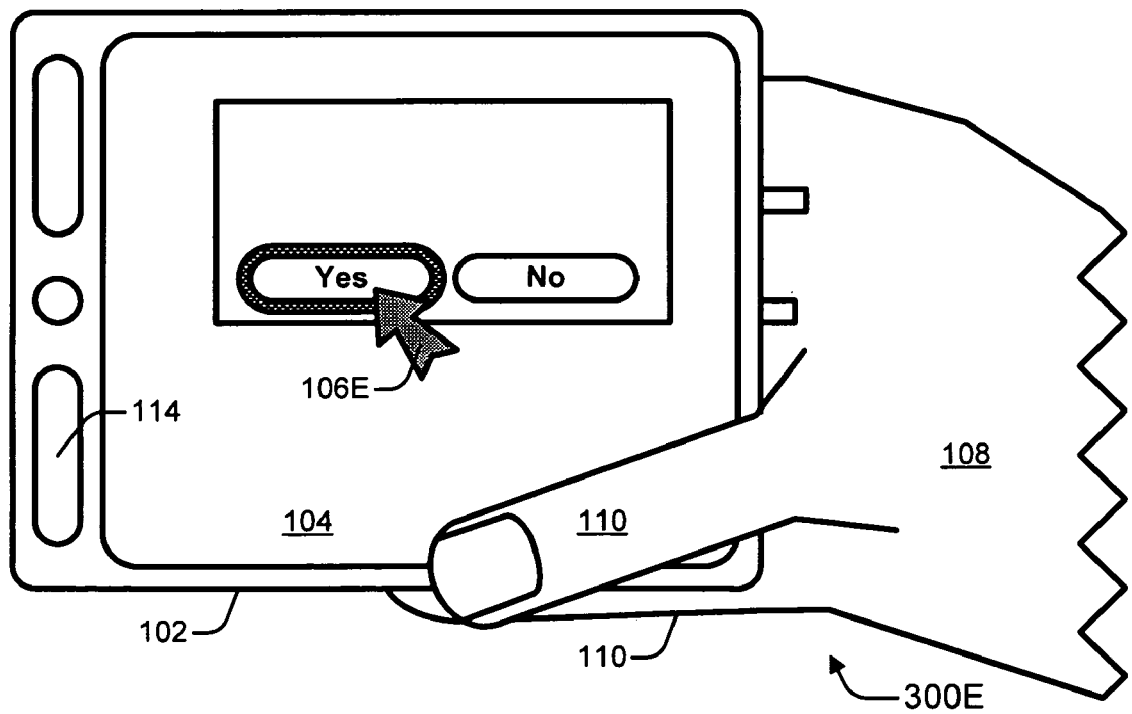

FIGS. 3D and 3E illustrate example front views 300D and 300E, respectively, of a device 102 having a form factor that is suitable for one-handed interaction, with the front views showing a display screen 104. As illustrated, front views 300D and 300E include a hand 108 with fingers 110 holding device 102. Display screen 104 and buttons 114 are visible on device 102.

In an example embodiment, front view 300D illustrates a tracking state on display screen 104, and front view 300E illustrates an engaged state on display screen 104. An interface icon 106T for the tracking state is shown. An interface icon 106E for the engaged state is also shown. An example operation is described with reference to FIG. 3F.

Figure 3F:
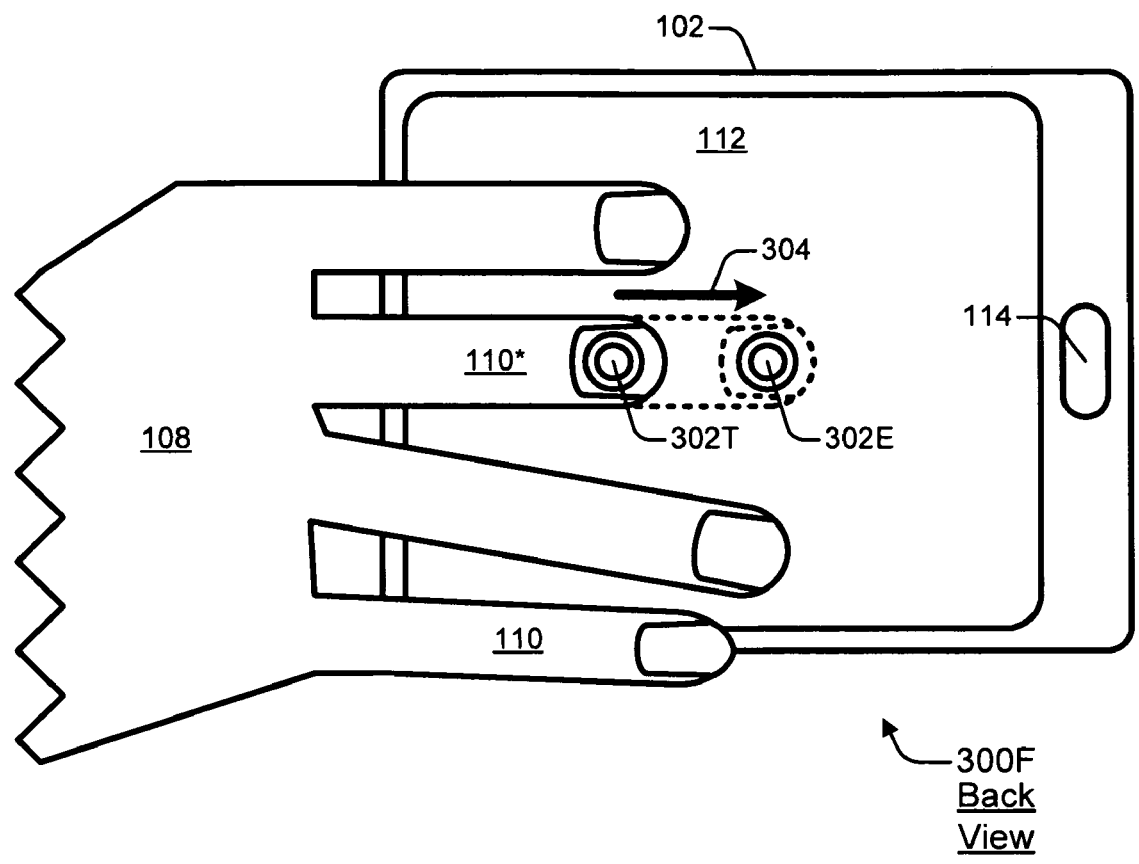
FIG. 3F illustrates an example back view of the device having a form factor that is suitable for one-handed interaction, with the back view showing a screen-reflective interface.

FIG. 3F illustrates an example back view 300F of the device 102 having a form factor that is suitable for one-handed interaction, with the back view showing a screen-reflective interface 112. As illustrated, device 102 also has at least one button 114 on the back side. A finger 110* is interacting with device 102 via screen-reflective interface 112.

Initially, an out-of-range state is in effect in which no interface icon 106 is displayed on display screen 104 (of FIGS. 3D and 3E). Next, finger 110* touches screen-reflective interface 112 at position 302T. This touch activates the tracking state. As shown with front view 300D, interface icon 106T is displayed on display screen 104 at a location that corresponds to position 302T.

While the tracking state is active, finger 110* is moved distance 304 to position 302E. The location of interface icon 106 is moved a corresponding proportional distance on display screen 104. As shown with front view 300E, the displayed location of interface icon 106 has moved from being over the "No" visual button to being over the "Yes" visual button. At position 302E, finger 110* presses screen-reflective interface 112 to activate an engaged state. Alternatively, pressing a button 114 (on any side) may activate the engaged state. As shown with front view 300E, interface icon 106E may indicate activation of the engaged state. For instance, the appearance of interface icon 106 may change and/or a displayed UI item may change (e.g., a visual button may appear to be pressed).

Activation of the engaged state may cause a distinct interaction functionality to be initiated. Examples of distinct interaction functionalities include, but are not limited to, a mouse-type click, a mouse-type drag operation, a mouse-type drag and drop operation, and so forth. These distinct interaction functionalities can initiate, for example, a visual button press, an item selection, firing of a weapon, resizing of a window, moving an item from one place to another, some combination thereof, and so forth.

An example UI dragging operation is described with reference to FIG. 3F. By way of explanation, if finger 110* were pressed at position 302T and moved to position 302E while continuously pressing screen-reflective interface 112 along distance 304, a dragging operation may be performed in response thereto. The dragging operation is performed on display screen 104 (of FIGS. 3D and 3E) from the location of interface icon 106T to the location of interface icon 106E. Alternatively, a dragging operation may be performed with a touch input from position 302T to position 302E if a button is pressed and held during the touching and movement.

Figure 4A:
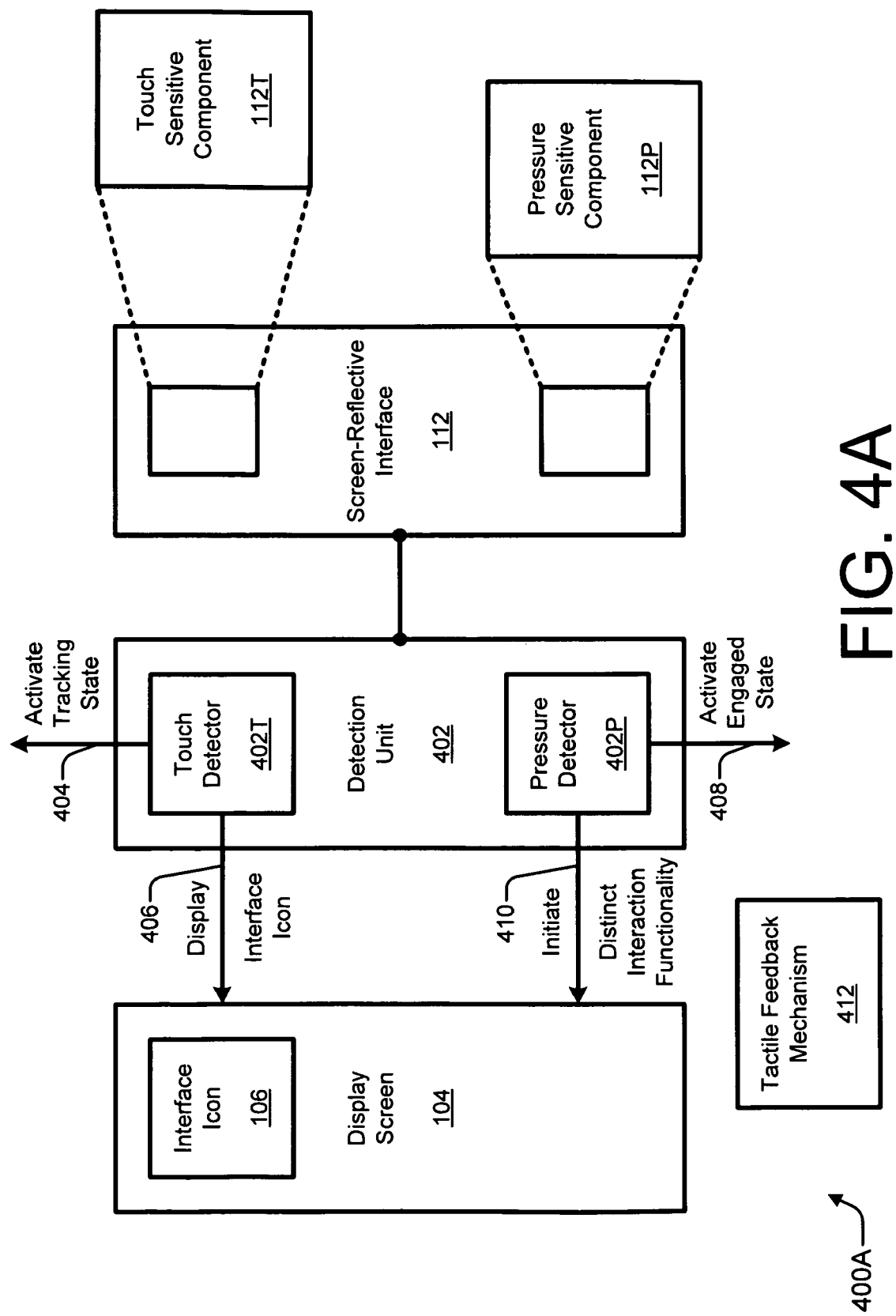
FIG. 4A is a general block diagram of an example portion of a device having a display screen, a screen-reflective interface, and a detection unit that may be used to track an input in a screen-reflective interface environment.

FIG. 4A is a general block diagram of an example portion 400A of a device having a display screen 104, a screen-reflective interface 112, and a detection unit 402 that may be used to implement a tracking input in a screen-reflective interface environment. As illustrated, display screen 104 may include one or more interface icons 106. Detection unit 402 includes a touch detector 402T and/or a pressure detector 402P. Screen-reflective interface 112 includes a touch sensitive component 112T and/or a pressure sensitive component 112P.

In an example embodiment, screen-reflective interface 112 is adapted to be sensitive to both touch and pressure. More specifically, touch sensitive component 112T is adapted to sense which position(s) on screen-reflective interface 112 are currently being touched. Pressure sensitive component 112P is adapted to sense when pressure is currently being applied to screen-reflective interface 112. Pressure sensitive component 112P, when included as part of screen-reflective interface 112, may be capable of sensing where pressure is currently being applied on screen-reflective interface 112 or may be merely capable of sensing that pressure is being applied at screen-reflective interface 112.

Detection unit 402 is adapted to process touch and pressure inputs and to ascertain when a touch input or a press input has been detected. Detection unit 402 may be realized as hardware, firmware, software, fixed logic circuitry, some combination thereof, and so forth. In an example operation, touch detector 402T is to detect a touch input on touch sensitive component 112T of screen-reflective interface 112. When a touch input is detected by touch detector 402T during an out-of-range state, a tracking state is activated at 404. Also, touch detector 402T is to instruct at 406 display screen 104 to display an interface icon 106 to indicate that the tracking state has been activated (e.g., via an operating system application programming interface (API)). The instruction at 406 to display an interface icon may also be provided to the underlying logic for whatever program(s) are currently being executed (e.g., for which images are currently being displayed).

Pressure detector 402P is to detect when a press input has occurred. The detected press input may be at pressure sensitive component 112P of screen-reflective interface 112 and/or at one or more buttons 114 (e.g., of FIGS. 1C and 3D-3F). When a press input is detected by pressure detector 402P while the tracking state is active, an engaged state is activated at 408. Also, pressure detector 402P is to instruct at 410 display screen 104 to initiate distinct interaction functionality to indicate that the engaged state has been activated. The instruction at 410 to initiate distinct interaction functionality may also be provided to the underlying logic for the programs that are currently being executed, an OS, and so forth. A press input may be deemed to have been detected when the detected force at pressure sensitive component 112P exceeds a predetermined threshold. The predetermined threshold may be adjustable by the user.

From a hardware perspective, screen-reflective interface 112 may be implemented using any of many different structures in different combinations. Example structures for implementing screen-reflective interface 112 generally, and touch sensitive component 112T and/or pressure sensitive component 112P specifically, are described below. However, other structures may alternatively be used to implement them.

Screen-reflective interface 112 may be implemented with a track pad (e.g., a capacitive track pad), a resistive screen, an optical tracking apparatus (e.g., using cameras, light emitting diodes and receptors, etc.), one or more switches, elastic material, electrical contacts, combinations thereof, and so forth. A specific example implementation is described herein below with particular reference to FIG. 4B.

In an example implementation, touch sensitive component 112T may be a track pad, and pressure sensitive component 112P may be at least one micro-switch. The track pad is mounted on the micro-switch. If one micro-switch is used, a lever system may be employed to at least partially equalize the pressure involved in activating the micro-switch regardless of where on the track pad the pressure is applied. Alternatively, multiple micro-switches may be used. For instance, one micro-switch may be placed at each of the four corners of a rectangular-shaped screen-reflective interface 112. Pressure detector 402P may be calibrated to determine when different sets of forces on different ones of the micro-switches are deemed to constitute a press input.

As another example implementation, touch sensitive component 112T may be implemented as a flexible touch pad with a pressure sensitive component 112P underneath. Also, pressure sensitive component 112P may be implemented as one or more force sensors.

As yet another example implementation, screen-reflective interface 112 may be implemented with one apparatus. In other words, touch sensitive component 112T and pressure sensitive component 112P may be realized using a single hardware component. For instance, a capacitive track pad is capable of sensing both touch and pressure. A relatively light finger contact registers as a relatively low capacitive increase, which may be deemed to equate to a touch input. A relatively heavier finger contact registers as a relatively high capacitive increase, which may be deemed to equate to a press input. In other words, a capacitive increase that meets a predetermined threshold may be deemed to constitute a press input instead of a touch input.

In another example embodiment, screen-reflective interface 112 may be capable of sensing multi-touch. Examples of multi-touch are shown in FIGS. 3A-3C. Screen-reflective interface 112 may be adapted to sense multiple different touch inputs simultaneously. Moreover, screen-reflective interface 112 may also be adapted to sense a press input at screen-reflective interface 112 overall or adapted to sense a potential respective press input at each individual point of detected touch input. The granularity of the pressure sensitivity may be essentially continuous or divided into a grid.

In yet another example embodiment, feedback confirmation of a detected press input may be provided by a device. For example, visual feedback may be provided via the display screen. Example feedback schemes that involve changing the appearance of the interface icon or other screen elements are shown in FIGS. 2D, 3A, 3B, and 3E. Other forms of feedback confirmation instead of or in addition to visual forms may be provided. Example other forms include audible feedback and tactile feedback. For audible feedback, a beep, chime, or other sound may be played by the device through a speaker.

With respect to tactile feedback, a mechanical hardware apparatus such as a micro-switch may intrinsically provide such feedback. For electrically-based forms of pressure sensing, the tactile feedback may be created when a press input is detected by firing a tactile feedback mechanism 412. For example, a thumper type of tactile feedback mechanism 412 may be coupled to pressure detector 402P. When a press input is detected by pressure detector 402P, the thumper may be fired to shake/vibrate the device.

Detection unit 402 may further provide one or more features to facilitate a user's control of a device with screen-reflective interface 112. For example, movements of a touch input may be filtered to smooth their displayed representation as movements to interface icon 106. More specifically, the movement of the location of an interface icon 106 on display screen 104 that is to reflect corresponding positional movements of a touch input on screen-reflective interface 112 may be smoothed via a filtering process. The location of interface icon 106 may also be stabilized via the filtering process. An example filter type that may be employed is a Kalman filter, but other filter types may be used.

Another example feature that detection unit 402 may provide is temporal position/location retrieval upon activation of the engaged state. When pressure detector 402P detects a press input, detection unit 402 may retrieve the position of the touch input on screen-reflective interface 112 and/or the location of interface icon 106 on display screen 104 at a predetermined period of time in the past. The engaged state may then be activated based on the retrieved position or location. This temporal position/location retrieval can compensate for the possible inadvertent movement of the user's finger during the pressing action. An example predetermined period of time is 80 milliseconds, but other times may be used instead.

Figure 4B:
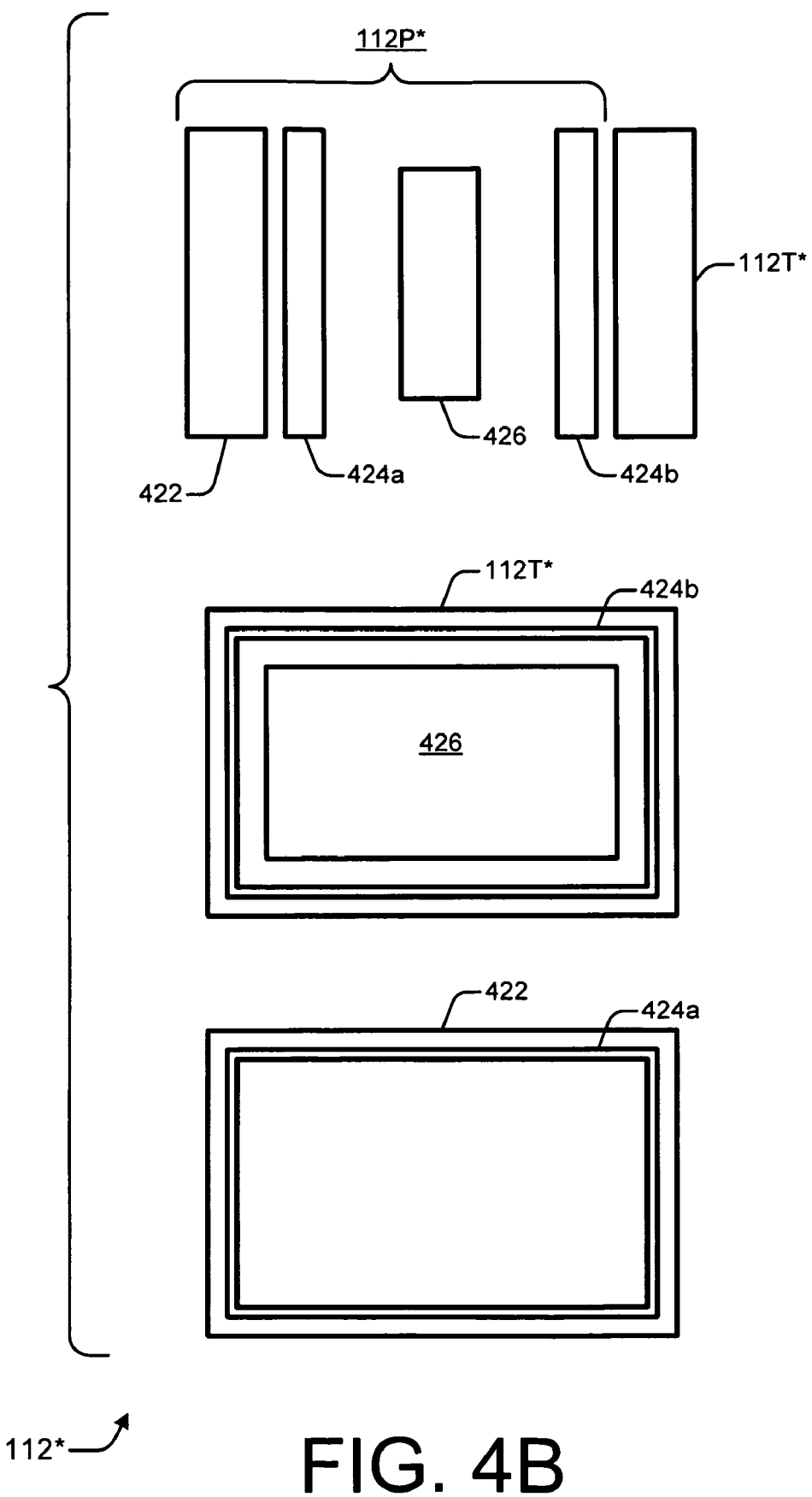
FIG. 4B is a block diagram of a specific example embodiment for a screen-reflective interface.

FIG. 4B is a block diagram of a specific example embodiment for a screen-reflective interface 112*. As illustrated by the exploded view in the top third of FIG. 4B, screen-reflective interface 112* includes a touch sensitive component 112T* and a pressure sensitive component 112P*. Pressure sensitive component 112P* includes a support panel 422, a first electrical contact 424a, an elastic material 426, and a second electrical contact 424b. First and second electrical contacts 424a and 424b are made from a conductive material such as metal.

For an example embodiment, touch sensitive component 112T* may be a track pad or resistive screen. As illustrated in the middle third of FIG. 4B, second electrical contact 424b is attached to touch sensitive component 112T*. Elastic material 426 is adhered to touch sensitive component 112T*. Alternatively, elastic material 426 may be adhered to support panel 422 or maintained in place with friction when the parts are secured together. Elastic material 426 may be foam, a layer of adhesive backed latex, and so forth.

As illustrated in the bottom third of FIG. 4B, first electrical contact 424a is attached to support panel 422. In operation, elastic material 426 biases touch sensitive component 112T* away from support panel 422 such that first and second electrical contacts 424a and 424b do not touch each other. Touch inputs from the user may be sensed by touch sensitive component 112T* without compressing elastic material 426. When a predetermined amount of force is exerted on touch sensitive component 112T* so that elastic material 426 is compressed and such that first and second electrical contacts 424a and 424b touch on another, a press input may be sensed via pressure sensitive component 112P*. Thus, a pressure detector 402P (of FIG. 4A) may detect a press input when electrical contact is made between first and second electrical contacts 424a and 424b.

Figure 5:
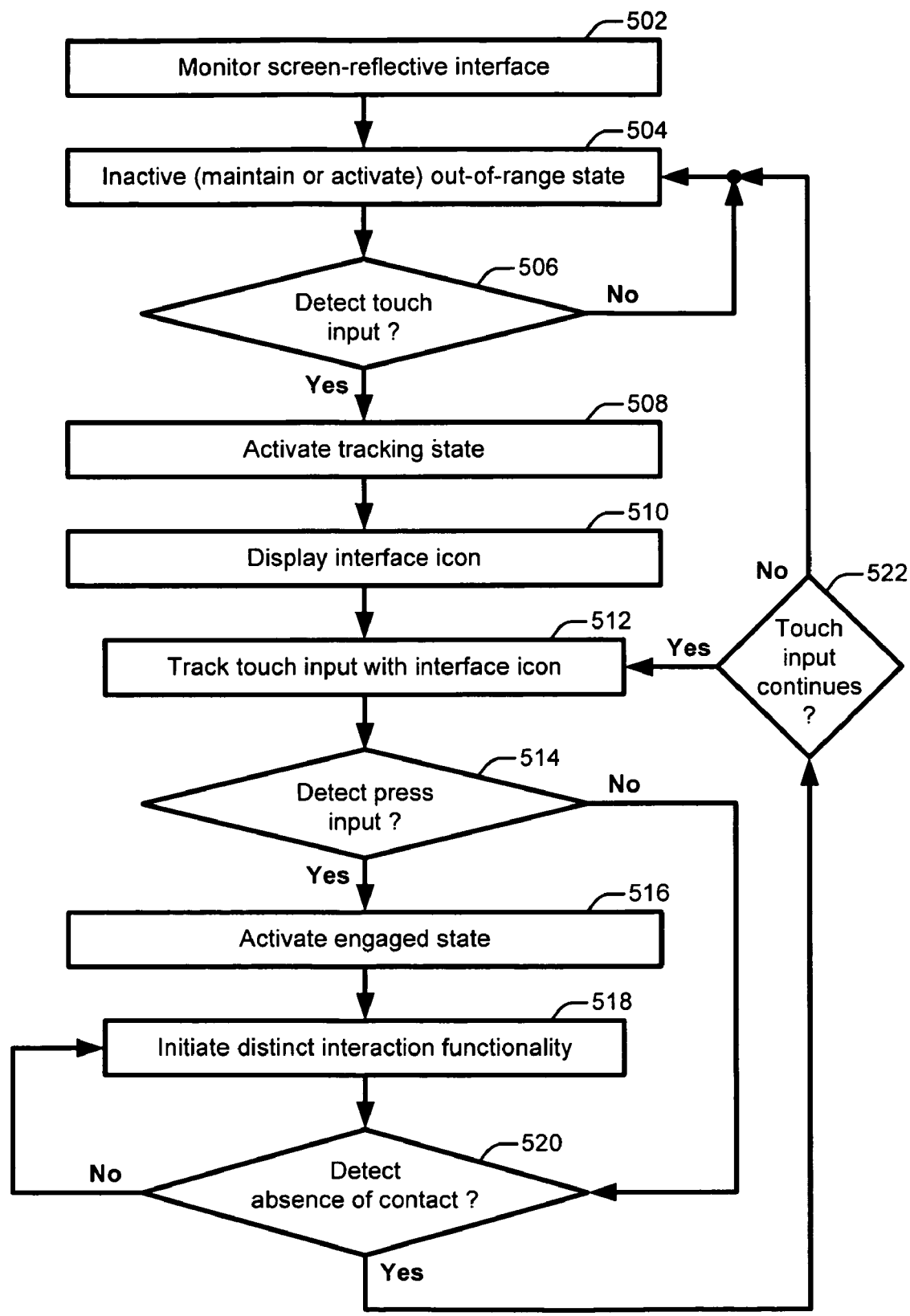
FIG. 5 is a flow diagram that illustrates an example of a method for tracking input in a screen-reflective interface environment.

FIG. 5 is a flow diagram 500 that illustrates an example of a method for tracking input in a screen-reflective interface environment. Flow diagram 500 includes eleven blocks 502-522. Implementations of flow diagram 500 may be realized, for example, as processor-executable instructions and/or as part of detection unit 402 (of FIG. 4), including at least partially by a touch detector 402T and/or a pressure detector 402P. Example embodiments for implementing flow diagram 500 are described below in conjunction with the description of FIGS. 1A-1C, 2A-2D, 3D-3F, and 4A.

Figure 6:
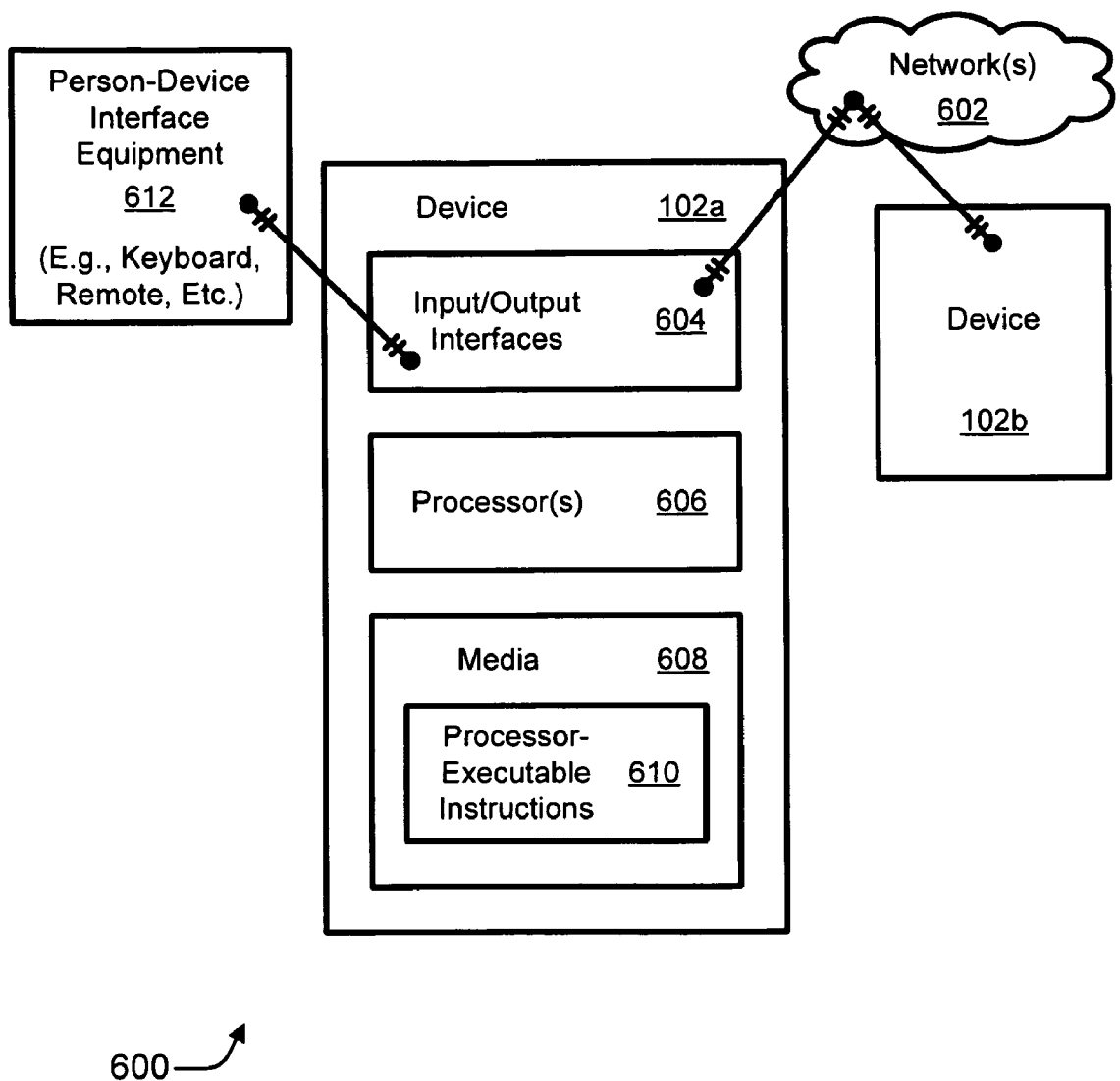
FIG. 6 is a block diagram illustrating example devices that may be used to implement embodiments for tracking input in a screen-reflective interface environment.

The acts of flow diagram 500 that are described herein may be performed in many different environments and with a variety of different devices, such as by one or more processing devices (e.g., of FIG. 6). The order in which the method is described is not intended to be construed as a limitation, and any number of the described blocks can be combined, augmented, rearranged, and/or omitted to implement a respective method, or an alternative method that is equivalent thereto. Although specific elements of certain other FIGS. are referenced in the description of this flow diagram, the method may be performed with alternative elements.

For example embodiments, at block 502, a screen-reflective interface is monitored. For example, a screen-reflective interface 112 may be monitored by a detection unit 402. At block 504, an inactive or out-of-range state is maintained. For example, out-of-range state 200A may be maintained during the monitoring until a touch input is detected at screen-reflective interface 112.

At block 506, it is determined if a touch input is detected. For example, it may be determined by touch detector 402T if a touch input at touch sensitive component 112T has been detected. If not, then the inactive out-of-range state is maintained at block 504. If a touch input is detected, then the method continues at block 508.

At block 508, a tracking state is activated. For example, a tracking state 200B may be activated responsive to detection of touch contact 202B on screen-reflective interface 112. At block 510, an interface icon is displayed. For example, an interface icon 106 may be displayed at 210 on a display screen 104 to indicate that the tracking state has been activated at 208.

At block 512, the touch input is tracked with the interface icon. For example, movement of a position 302 of the touch input on screen-reflective interface 112 may be tracked while the tracking state is active at 212 by correspondingly moving a location of interface icon 106 on display screen 104 (e.g., from the location of interface icon 106T to the location of interface icon 106E in FIGS. 3D and 3E). Hence, the location of interface icon 106 on display screen 104 may correspond to and reflect the position of touch plus finger movement contact 202C on screen-reflective interface 112.

At block 514, it is determined if a press input is detected. For example, it may be determined by pressure detector 402P if a press input at a pressure sensitive component 112P (if implemented) or at a button 114 (if implemented) has been detected. If not, then the method continues at block 520 to determine if contact is still present at the screen-reflective interface. If, on the other hand, a press input is detected, then the method continues at block 516.

At block 516, an engaged state is activated. For example, an engaged state 200D may be activated at 216 responsive to detection of press contact 202D. A feedback of an audible, visual, and/or tactile nature may be provided to indicate that the engaged state has been activated.

At block 518, distinct interaction functionality is initiated. For example, a click, a drag, a drag and drop, or some other distinct interaction functionality may be initiated at 218. The distinct interaction functionality may entail clicking a visual button, moving or resizing a visual object, presenting a menu or other set of options, otherwise controlling or adjusting the device via a GUI, and so forth.

At block 520, it is determined if the absence of contact is detected. For example, it may be determined that either a touch input or a press input or both have ceased being detected at screen-reflective interface 112. If the absence of contact is not being detected (i.e., a touch contact 202B and a press contact 202D are still being detected), then the method may continue at block 518 to continue the distinct interaction functionality (e.g., to implement a drag operation).

On the other hand, if the absence of contact is detected (at block 520), then the method continues at block 522. At block 522, it is determined if the touch input continues. If the touch input continues (and the press input has ceased), then the method continues at block 512 to track the touch input with the interface icon. If the touch input does not continue (and hence there is neither touch nor press inputs), then the method continues at block 504 by activating the out-of-range state.

FIG. 6 is a block diagram 600 illustrating example devices 102 that may be used to implement embodiments for tracking input in a screen-reflective interface environment. As illustrated, block diagram 600 includes two devices 102a and 102b, person-device interface equipment 612, and one or more network(s) 602. As explicitly shown with device 102a, each device 102 may include one or more input/output interfaces 604, at least one processor 606, and one or more media 608. Media 608 may include processor-executable instructions 610.

For example embodiments, device 102 may represent any processing-capable device. Example devices 102 include personal or server computers, hand-held or other portable electronics, entertainment appliances, network components, some combination thereof, and so forth. Device 102a and device 102b may communicate over network(s) 602. Network(s) 602 may be, by way of example but not limitation, an internet, an intranet, an Ethernet, a public network, a private network, a cable network, a digital subscriber line (DSL) network, a telephone network, a wireless network, some combination thereof, and so forth. Person-device interface equipment 612 may be a keyboard/keypad, a touch screen, a remote, a mouse or other graphical pointing device, a display screen 104 (e.g. of FIG. 1A), a speaker, a button 114 (e.g., of FIG. 1C), a screen-reflective interface 112 (e.g., of FIG. 1B), and so forth. Person-device interface equipment 612 may be integrated with or separate from device 102a.

I/O interfaces 604 may include (i) a network interface for monitoring and/or communicating across network 602, (ii) a display device interface for displaying information on a display screen, (iii) one or more person-device interfaces, and so forth. Examples of (i) network interfaces include a network card, a modem, one or more ports, a network communications stack, a radio, and so forth. Examples of (ii) display device interfaces include a graphics driver, a graphics card, a hardware or software driver for a screen or monitor, and so forth. Examples of (iii) person-device interfaces include those that communicate by wire or wirelessly to person-device interface equipment 612. A given interface may function as both a display device interface and a person-device interface.

Processor 606 may be implemented using any applicable processing-capable technology, and one may be realized as a general-purpose or a special-purpose processor. Examples include a central processing unit (CPU), a microprocessor, a controller, a graphics processing unit (GPU), a derivative or combination thereof, and so forth. Media 608 may be any available media that is included as part of and/or is accessible by device 102. It includes volatile and non-volatile media, removable and non-removable media, storage and transmission media (e.g., wireless or wired communication channels), hard-coded logic media, combinations thereof, and so forth. Media 608 is tangible media when it is embodied as a manufacture and/or as a composition of matter.

Generally, processor 606 is capable of executing, performing, and/or otherwise effectuating processor-executable instructions, such as processor-executable instructions 610. Media 608 is comprised of one or more processor-accessible media. In other words, media 608 may include processor-executable instructions 610 that are executable by processor 606 to effectuate the performance of functions by device 102. Processor-executable instructions 610 may be embodied as software, firmware, hardware, fixed logic circuitry, some combination thereof, and so forth.

Thus, realizations for tracking input in a screen-reflective interface environment may be described in the general context of processor-executable instructions. Processor-executable instructions may include routines, programs, applications, coding, modules, protocols, objects, components, metadata and definitions thereof, data structures, APIs, etc. that perform and/or enable particular tasks and/or implement particular abstract data types. Processor-executable instructions may be located in separate storage media, executed by different processors, and/or propagated over or extant on various transmission media.

As specifically illustrated, media 608 comprises at least processor-executable instructions 610. Processor-executable instructions 610 may comprise, for example, detection unit 402 (of FIG. 4A). Generally, processor-executable instructions 610, when executed by processor 606, enable device 102 to perform the various functions described herein. Such functions include, by way of example, those that are illustrated in flow diagram 500 (of FIG. 5) and those pertaining to features illustrated in the various block diagrams, as well as combinations thereof, and so forth.

The devices, acts, features, functions, methods, modules, data structures, techniques, components, etc. of FIGS. 1A-6 are illustrated in diagrams that are divided into multiple blocks and other elements. However, the order, interconnections, interrelationships, layout, etc. in which FIGS. 1A-6 are described and/or shown are not intended to be construed as a limitation, and any number of the blocks and/or other elements can be modified, combined, rearranged, augmented, omitted, etc. in many manners to implement one or more systems, methods, devices, media, apparatuses, arrangements, etc. for tracking input in a screen-reflective interface environment.

Although systems, methods, devices, media, apparatuses, arrangements, and other example embodiments have been described in language specific to structural, logical, algorithmic, and/or functional features, it is to be understood that the invention defined in the appended claims is not necessarily limited to the specific features or acts described above. Rather, the specific features and acts described above are disclosed as example forms of implementing the claimed invention.

What is claimed is:

1. A device comprising:
a display screen disposed on a first side of the device;
a screen-reflective interface disposed on a second side of the device opposite the first side;
at least one processor; and
processor-executable instructions that configure the device to:
monitor the screen-reflective interface;
detect a touch input comprising a user touch contact with the screen-reflective interface;
activate a tracking state for the screen-reflective interface responsive to the detected touch input on the screen-reflective interface;
display a first interface icon on the display screen to indicate that the tracking state has been activated, the first interface icon displayed at a location of the display screen that corresponds to a position of the touch input on the screen-reflective interface;
detect a press input comprising a user press contact with the screen-reflective interface while the tracking state is activated, the user press contact being different than the user touch contact;
activate an engaged state for the screen-reflective interface responsive to the detected press input at the screen-reflective interface, wherein the engaged state comprises initiating at least one distinct interaction functionality that visually distinguishes the press input from the touch input by replacing, in response to the user press contact with the screen-reflective interface, the first interface icon with a second interface icon that is different than the first interface icon and is displayed on the display screen at a location that corresponds to a position of the press input on the screen-reflective interface.

2. The device as recited in claim 1, comprising processor-executable instructions that configure the device:
detect a press input at the screen-reflective interface while the tracking state is activated, and, in response, activate a tactile feedback mechanism of the device.

3. The device as recited in claim 1, wherein the press contact is detected when a detected force at a pressure sensitive component exceeds a predetermined threshold, and wherein the touch input is detected when the pressure sensitive component does not detect a force that exceeds the predetermined threshold.

4. The device as recited in claim 1, comprising processor-executable instructions that configure the device to:
display one or more images on the display screen;
detect an absence of contact at the screen-reflective interface;
activate an out-of-range state for the screen-reflective interface responsive to the detected absence of contact; and remove the interface icon from the display screen for the out-of-range state while the one or more images remain displayed on the display screen.

5. The device as recited in claim 4, comprising processor-executable instructions that configure the device to:
track, while the tracking state is activated, a current position of the touch input on the screen-reflective interface by moving the interface icon to a current location of the display screen that corresponds to the current position of the touch input so as to reflect the current position of the touch input on the screen-reflective interface with the current location of the interface icon on the display screen.

6. A device comprising:
a first side;
a second side, the second side opposite the first side;
a display screen disposed on the first side;
a screen-reflective interface disposed on the second side, respective positions on the screen-reflective interface corresponding to respective locations of the display screen; and
a detection unit configured to:
monitor the screen-reflective interface;
display an image of one or more fingers at one or more locations of the display screen that correspond to one or more positions currently being touched on the screen-reflective interface by one or more fingers of a user;
detect a touch input comprising a user touch contact with the screen-reflective interface at a first position on the screen-reflective interface;
detect a press input comprising a user press contact with the screen-reflective interface at a second position on the screen-reflective interface; and
simultaneously display first and second interface icons on the display screen, the first interface icon displayed at a first location on the display screen that corresponds to the first position of the user touch contact with the screen-reflective interface, and the second interface icon displayed at a second location on the display screen that corresponds to the second position of the user press contact with the screen-reflective interface, wherein the first and second interface icons are different and visually distinguish the press input from the touch input.

7. The device as recited in claim 6, the device further comprising at least one button that is physically separate from the screen-reflective interface and from the display screen; and the detection unit further comprising:
a pressure detector configured to:
detect a press input at the at least one button while the tracking state is activated; and
activate an engaged state for the screen-reflective interface responsive to the detected press input at the at least one button and to initiate at least one distinct interaction functionality for the engaged state.

8. The device as recited in claim 6, the detection unit being configured to track, while the tracking state is activated, a current position of the touch input on the screen-reflective interface by moving the interface icon to a current location of the display screen that corresponds to the current position of the touch input.

9. The device as recited in claim 6, the detection unit configured to filter movements of the touch input on the screen-reflective interface by smoothing movements of the interface icon as it is displayed on the display screen.

10. The device as recited in claim 6, the detection unit configured to retrieve a position of the touch input or a location of the interface icon at a predetermined period of time in the past when a press input is detected; and the detection unit configured to activate an engaged state based on the retrieved position or location.

11. The device as recited in claim 6, the detection unit further comprising:
a pressure detector configured to:
detect a press input at the screen-reflective interface while the tracking state is activated; and
activate an engaged state for the screen-reflective interface responsive to the detected press input at the screen-reflective interface and to initiate at least one distinct interaction functionality for the engaged state.

12. The device as recited in claim 11, the pressure detector being coupled to a tactile feedback mechanism and configured to fire the tactile feedback mechanism when the engaged state is activated providing tactile feedback to a user of the device.

13. The device as recited in claim 6, the screen-reflective interface comprising:
a touch sensitive component that is adapted to sense one or more touch inputs; and
a pressure sensitive component that is adapted to sense one or more press inputs.

14. The device as recited in claim 13, the touch sensitive component comprising a track pad, and the pressure sensitive component comprising:
a first electrical contact,
a second electrical contact attached to the track pad, and
an elastic material biasing the second electrical contact away from the first electrical contact, the elastic material being compressible upon application of pressure to the track pad by a user until the second electrical contact touches the first electrical contact activating an engaged state for the screen-reflective interface.

15. A device comprising:
a first side;
a second side, the second side opposite the first side;
a display screen disposed on the first side;
a screen-reflective interface disposed on the second side, respective positions on the screen-reflective interface corresponding to respective locations of the display screen, the screen-reflective interface comprising:
a touch sensitive component; and
a pressure sensitive component comprising:
first and second electrical contacts comprising conductive material; and
an elastic material positioned at least partially between the first and second electrical contacts biasing the second electrical contact away from the first electrical contact, the elastic material being compressible upon application of pressure to the touch sensitive component by a user to create electrical contact between the first and second electrical contacts; and
a detection unit comprising:
a touch detector configured to monitor the touch sensitive component and sense a touch contact on the screen-reflective interface and, in response to the touch contact, activate a tracking state in which a first interface icon is displayed on the display screen at a location corresponding to the touch contact; and
a pressure detector configured to monitor the pressure sensitive component and detect a press contact above a threshold force on the screen-reflective interface and, in response to the press contact, activate an engaged state in which a second interface icon is displayed on the display screen at a location corresponding to the press contact, the first and second interface icons visually distinguishing the press contact from the touch contact.

16. The device of claim 15, wherein the touch sensitive component comprising a track pad and the second electrical contact is attached to the track pad.

17. The device of claim 15, wherein the first and second interface icons are displayed simultaneously.

* * * * *